United States Patent
Beghi et al.

(10) Patent No.: US 10,677,470 B2
(45) Date of Patent: Jun. 9, 2020

(54) FIXATION SYSTEM FOR GAS VALVES

(71) Applicant: ELECTROLUX APPLIANCES AKTIEBOLAG, Stockholm (SE)

(72) Inventors: Maurizio Beghi, Forli (IT); Massimo Banzato, Forli (IT); Oscar Alberto Salazar, Forli (IT); Giuseppe Lando, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 111 days.

(21) Appl. No.: 15/542,690

(22) PCT Filed: Jan. 19, 2016

(86) PCT No.: PCT/EP2016/050972
§ 371 (c)(1),
(2) Date: Jul. 11, 2017

(87) PCT Pub. No.: WO2016/124391
PCT Pub. Date: Aug. 11, 2016

(65) Prior Publication Data
US 2017/0350601 A1    Dec. 7, 2017

(30) Foreign Application Priority Data

Feb. 5, 2015   (EP) ..................... 15153976

(51) Int. Cl.
*F16C 3/12*     (2006.01)
*F24C 3/00*     (2006.01)
(Continued)

(52) U.S. Cl.
CPC .............. *F24C 3/126* (2013.01); *F16L 41/12* (2013.01); *F23N 1/007* (2013.01); *F24C 3/008* (2013.01);
(Continued)

(58) Field of Classification Search
CPC ........... F24C 3/126; F24C 3/008; F16L 41/12; F23N 1/007; F23N 2035/18; F23N 2041/08; F16K 27/06
See application file for complete search history.

(56) References Cited

U.S. PATENT DOCUMENTS 3,602,480 A    8/1971 Demi
3,870,348 A    3/1975 Hawkins
(Continued)

FOREIGN PATENT DOCUMENTS

FR    2029831 A5    10/1970
GB    2312262 A     10/1997
WO    2001073326 A1 10/2001

OTHER PUBLICATIONS

International Search Report and Written Opinion issued in application No. PCT/EP2016/050972 dated Mar. 7, 2016, 10 pages.

*Primary Examiner* — Jessica Cahill
*Assistant Examiner* — Patrick C Williams
(74) *Attorney, Agent, or Firm* — Pearne & Gordon LLP

(57) ABSTRACT

Gas circuit (1) for a kitchen appliance (2) comprising a gas rail (3) with a gas inlet (4) for connecting said gas rail (3) to a gas source (5) and with at least one gas outlet (6), said gas circuit (1) further comprising a gas tube (7) for providing gas from said gas outlet (6) to a gas hob (8), and said gas circuit (1) further comprising a gas valve assembly (9) connecting said gas tube (7) to said gas outlet (6) of said gas rail (3) in a flow conducting manner, said gas valve assembly (9) comprising a gas valve (10) with a valve body (11) and fixation means (12) fixing said valve body (11) to said gas rail (3) such that said gas valve (10) is supported by said gas rail (3), characterized in that said fixation means (12) comprise a first spring member (13a) looping around said gas rail (3) and/or said valve body (11), thereby resiliently bracing said gas valve (10) and said gas rail (3).

18 Claims, 6 Drawing Sheets

(51) Int. Cl.
*F23N 1/00* (2006.01)
*F16L 41/12* (2006.01)
*F16K 27/06* (2006.01)
*F24C 3/12* (2006.01)

(52) U.S. Cl.
CPC .......... *F16K 27/06* (2013.01); *F23N 2235/18* (2020.01); *F23N 2241/08* (2020.01)

(56) References Cited

U.S. PATENT DOCUMENTS

| | | | | |
|---|---|---|---|---|
| 5,169,177 A | * | 12/1992 | McLennan | A62C 35/68 |
| | | | | 285/197 |
| 5,890,750 A | * | 4/1999 | Channell | C02F 1/325 |
| | | | | 285/321 |
| 7,543,856 B2 | * | 6/2009 | Lang | F16L 9/006 |
| | | | | 137/343 |
| 2006/0151996 A1 | | 7/2006 | Lang | |
| 2007/0044786 A1 | | 3/2007 | Frost | |
| 2010/0263884 A1 | * | 10/2010 | Perkovich | A62C 35/68 |
| | | | | 169/43 |
| 2011/0174838 A1 | * | 7/2011 | Schroeder | B67D 1/0043 |
| | | | | 222/144.5 |
| 2014/0049042 A1 | * | 2/2014 | Jones | F16L 37/144 |
| | | | | 285/319 |

* cited by examiner

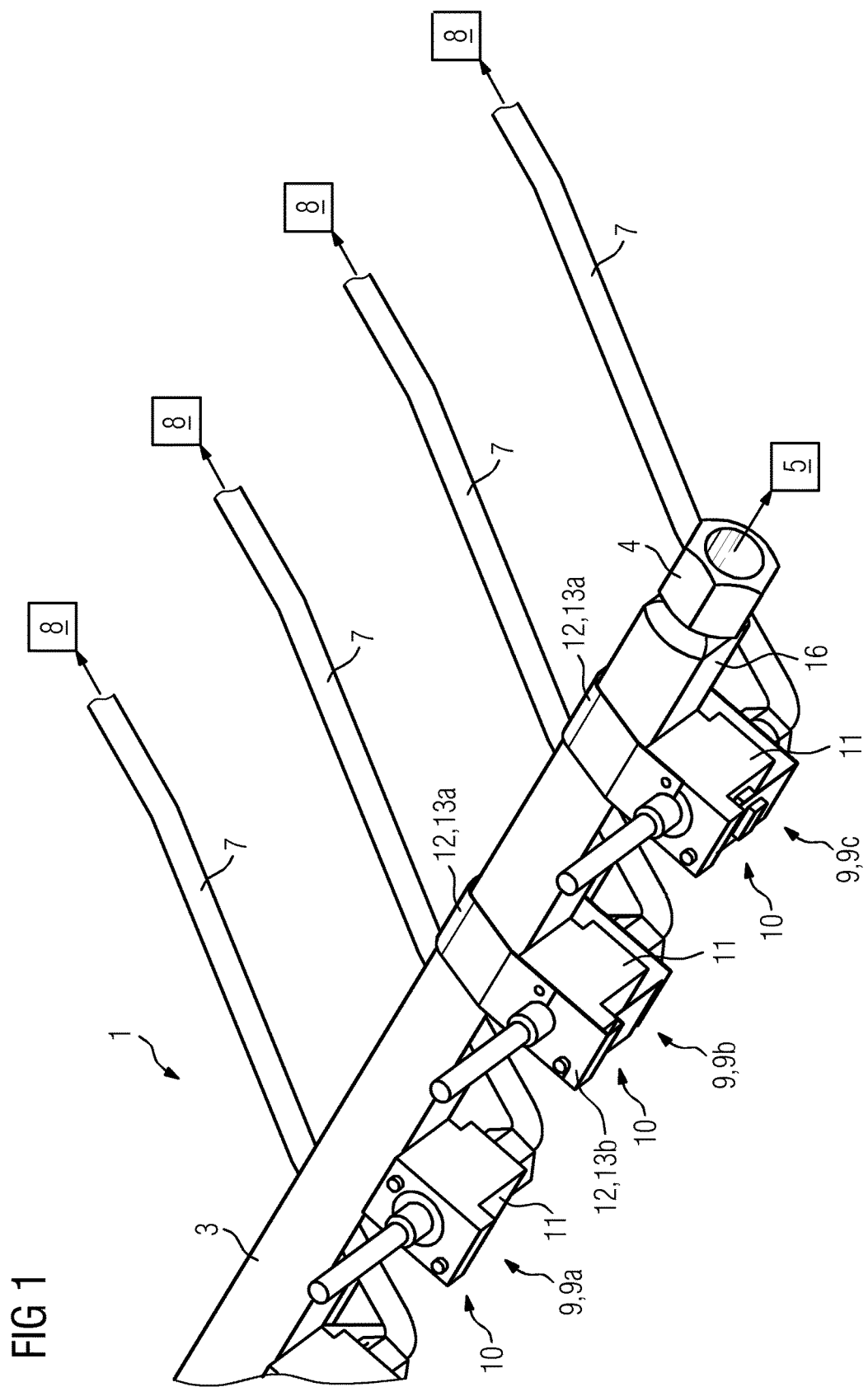

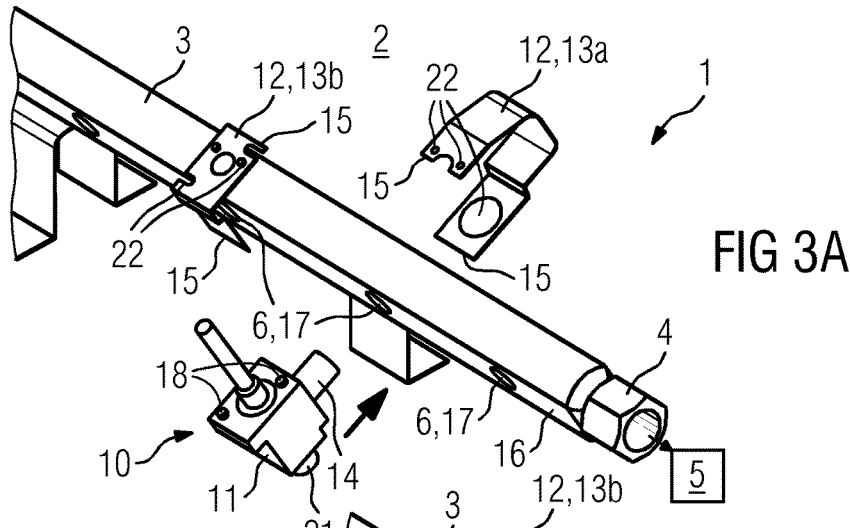
FIG 3A
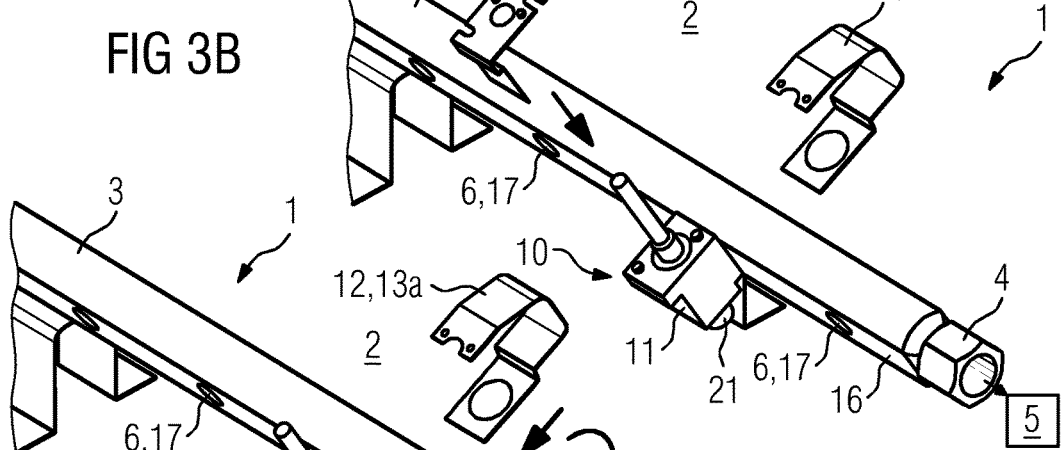
FIG 3B
FIG 3C
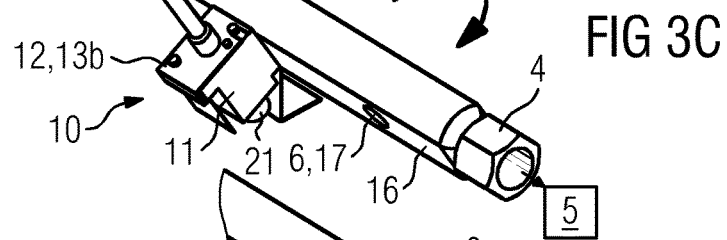
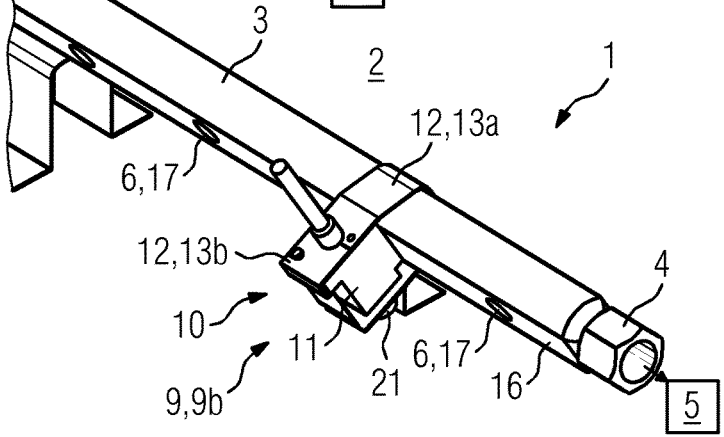
FIG 3D

FIXATION SYSTEM FOR GAS VALVES

The present invention relates to a gas circuit for a kitchen appliance, a gas valve assembly for a gas circuit, fixation means for a gas valve assembly and a kitchen appliance, in particular gas stove or a gas oven, comprising such gas circuit.

In such gas circuit for a kitchen appliance, particularly for a gas hob, a gas rail usually comprises a gas inlet for connecting said gas rail to a gas source and at least one gas outlet. Such gas circuit usually further comprises a gas tube for providing gas from said gas outlet to a gas hob. In order to connect said gas tube to said gas outlet in a flow-conducting manner, said gas circuit further comprises a gas valve assembly, usually comprising a gas valve with a valve body. It is particularly known to fix said valve body to said gas rail such that said gas valve is supported by said gas rail, particularly using a bracket, which is looping around the gas rail, wherein said bracket is screwed to the gas valve, such that said screwed bracket holds against each other the gas valve and the gas rail. Additionally the gas tube is screwed to the gas valve.

However, the assembly of such gas valve assembly is relatively complex, particularly time and parts consuming. Moreover, the relative positioning and fixation of the gas valve assembly, particularly the gas valve, more particularly the valve body, and the gas tube to the gas rail according to known solution is mainly achieved by screwing, which is disadvantageous, particularly in precise positioning of the gas valve assembly onto the gas rail. Particularly, if gas valves or gas tubes are incorrectly fixed or attached to a gas rail, gas leakage may occur, which results in a malfunction and/or severe safety risks. Moreover, an imprecise alignment of the gas valve shafts, and thus of knobs attached to said shafts, may result in aesthetical problems.

It is an object of the present invention to provide a gas circuit for a kitchen appliance, particularly a gas hob, and/or a gas valve assembly for such a gas circuit that solves the above-described problems.

It is a further object of the present invention to provide a gas circuit for a kitchen appliance, particularly a gas hob, and/or a gas valve assembly for such a gas circuit that allows for an easier and less complex assembly, particularly a faster assembly of such gas valve assembly.

It is a still further object of the present invention to a gas circuit for a kitchen appliance, particularly a gas hob, and/or a gas valve assembly for such a gas circuit that is independent from screwing components of such gas valve assembly to the gas tube and/or gas rail.

A gas circuit for a kitchen appliance according to an embodiment comprises at least a gas rail with a gas inlet for connecting said gas rail to a gas source and with at least one gas outlet, said gas circuit further comprising a gas tube for providing gas from said gas outlet to a gas hob, and said gas circuit further comprising a gas valve assembly connecting said gas tube to said gas outlet of said gas rail in a flow conducting manner, said gas valve assembly comprising a gas valve with a valve body and fixation means fixing said valve body to said gas rail such that said gas valve is supported by said gas rail.

Such gas circuit for a kitchen appliance according to the present invention is characterized in that said fixation means comprise a first spring member looping around said gas rail and/or said valve body, thereby resiliently bracing said gas valve and said gas rail.

A gas valve assembly according to the present invention allows connecting said gas tube to said gas outlet of said gas rail in a flow conducting manner, such that a fluid communication between said gas tube and said gas rail is achieved, which can be regulated by said gas valve assembly, particularly by said gas valve. Said gas valve may further comprise and/or be connected to a cock or tap, or to a user interface, which allows a user to adjust and/or regulate the amount of gas, which can flow from the gas rail to the gas tube, and thus to the gas hob. The gas valve in the gas circuit and/or gas valve assembly according to the present invention therefore allows regulating and/or adjusting the amount of gas, which flows from the gas rail to the gas tube.

Advantageously, fixation means are provided for fixing said valve body to said gas rail, such that said gas valve is supported by said gas rail, whereby said fixation means comprise a first spring member looping around said gas rail and/or said valve body, thereby resiliently bracing said gas valve and said gas rail.

Thereby, complexity of the gas valve assembly is reduced, particularly in that a screwing step is not needed. Furthermore, a more precise positioning of the gas valve assembly, particularly the gas valve onto the gas rail is facilitated, particularly as a relatively large interface area may be provided between such fixation means, particularly the first spring member, and other assembly components, particularly the gas valve, valve body, and the gas rail.

This advantageously allows for a gas circuit and/or a gas valve assembly according to the present invention, which is relatively fast to assemble, and whereby, particularly screws are not needed for the assembly. This allows for a relatively fast and easy installation of the gas circuit and/or gas valve assembly according to the present invention on site, and thus significantly reduces direct labour costs.

Particularly, the gas circuit and/or the gas valve assembly according to the present invention may be configured as a screw-free gas circuit and/or the gas valve assembly. Particularly, as the present invention requires less or, preferably no screwing step during the assembly process less time is needed to assemble the gas valve assembly according to the present invention.

Fixation means for fixing said valve body to said gas rail, preferably allow for directly fixing said valve body to said gas rail, without any further supporting element, such as a mounting rail or wall element.

The fixation means, particularly the spring member, according to the present invention is looping around said gas rail and/or said valve body, thereby resiliently bracing said gas valve and said gas rail.

In an embodiment, such spring member may be configured such that it is looping around said gas rail such that it is closed with itself, whereby the spring member forms a closed loop around said gas rail.

In such configuration, an assembly of the gas circuit according to present invention may be advantageously carried out without a screwing operation to fix the gas valve to the gas rail, which may significantly reduce direct labour costs. Particularly, in a situation where such spring member has to be replaced, e.g. due to damage or wearing, such spring member may be replaced or exchanged without the need of disassembling the whole gas valve assembly. The same applies, if a spring member has to be exchanged for other reasons.

In a further embodiment, such spring member looping around said gas rail may be mounted with at least one end, preferably each end, to a locking member, whereby preferably such locking member and such spring member are configured to form a closed loop around said gas rail and/or said gas valve.

In a further embodiment, the gas valve, particularly the valve body comprises at least one locking member, e.g. in the form of protrusions or the like, where the spring member can be attached and locked to.

In a still further embodiment, such spring member looping around said gas rail may be configured such that at least one end of such spring member, preferably each end, is mounted to and/or hooked to the gas valve. The spring member may be formed as one-piece or multiple-piece, particularly two-piece, wherein different pieces may be mounted together on one side, and mounted to the gas valve or gas rail on the other side, respectively.

In such configuration, an assembly of the gas circuit according to present invention may be advantageously carried out without a screwing operation to fix the gas valve to the gas rail, which may significantly reduce direct labour costs. The particular configuration and design of the gas valve assembly according to the present invention, particularly the used fixation means and spring member can thereby be easily adapted to the intended purpose. For example, an already existing gas valve and/or gas rail assembly, can be equipped with such fixation means according to the present invention, with only slight modifications.

Additionally or alternatively, such spring member looping around said gas rail may be mounted with at least one end directly to the valve body with or without mounting said at least one end to such locking member. In connection therewith, it will be immediately understood that such spring member is capable of exhibiting a spring force, which can be used as such to mount and fix the gas valve to a gas rail, particularly by a snap action of the spring member, e.g. similar to the lightning type closure systems known from glass bottles.

In a still further embodiment, such spring member looping around said gas rail may be configured such that said spring member is looping around said gas valve, and at least one end of such spring member, preferably each end, is mounted to and/or hooked to the gas rail. The spring member may be formed as one-piece or multiple-piece, particularly two-piece, wherein different pieces may be mounted together on one side, and mounted to the gas valve or gas rail on the other side, respectively.

In such configuration, an assembly of the gas circuit according to present invention may be advantageously carried out without a screwing operation to fix the gas valve to the gas rail, which may significantly reduce direct labour costs. The particular configuration and design of the gas valve assembly according to the present invention, particularly the used fixation means and spring member can thereby be easily adapted to the intended purpose. For example, an already existing gas valve and/or gas rail assembly, can be equipped with such fixation means according to the present invention, with only slight modifications of the spring member, fixation means or the gas rail.

It is to be understood that in any embodiment of the present invention said gas valve is supported by said gas rail. Accordingly and advantageously, a mounting structure, e.g. a mounting plate, or the like, is not needed.

In an advantageous embodiment of the inventive gas circuit said gas outlet of said gas rail is an opening of said gas rail, wherein said gas valve comprises an inlet duct, said inlet duct being at least partially inserted into and/or sealed to said opening (, wherein preferably said opening is arranged in a wall, particularly a side wall of said gas rail.

Said inlet duct may at least partially be inserted into and/or sealed to said opening using a sealing means or sealing member or may be arranged and configured congruent in shape, e.g. a sealing cone or the like. This advantageously prevents that gas may leak out of the connection between gas outlet of said gas rail and inlet duct of said gas valve in an undesired manner.

In a further advantageous embodiment of the inventive gas circuit, said first spring member comprises attachment means at two opposite sides, said attachment means in particular being any of hooks, bails, grooves, or spring-loaded edges.

Such attachment means at the two opposite sides may be same or different. For example, a hook may be formed on one side, whereas a bail may be formed on the other side. Also at one side of the spring member different attachment means, e.g. a hook and a bail or two different hooks, etc., may be formed.

It is to be understood that an attachment means advantageously allows that under a spring tension of the spring member, the various elements of the valve assembly, particularly the spring member and the valve body and/or the gas rail, are held together.

In a further advantageous embodiment of the inventive gas circuit, said attachment means attach said spring member to said valve body, wherein in particular said spring member is looping around said gas rail, or characterized in that said attachment means attach said spring member to said gas rail by means of said attachment means, wherein in particular said first spring member loops around said valve body.

In a further advantageous embodiment of the inventive gas circuit, said valve, particularly the valve body and/or the fixation means comprises a locking member, wherein said attachment means attach said first spring member to said locking member, wherein in particular said first spring member and said locking member together loop around both said gas rail and said valve body, or characterized in that said attachment means at either side of said first spring member (are mutually attached to each other, wherein in particular said first spring member loops around both said gas rail and said valve body.

This particularly allows for an easier mounting of the gas valve assembly. More particularly, the locking member allows for a more secure mounting of the spring member. Additionally, said fixation means may be configured as a multi-piece, particularly two-piece. Accordingly, such fixation means may be easily mounted around an element protruding from said valve, particularly said valve body, e.g. a shaft of the gas valve.

Such locking member may be configured as a single-piece or multi-piece, whereby different pieces may be arranged side by side or one behind the other. Particularly, a locking member may also be configured as a spring member, particularly a second spring member as referred to herein.

In an embodiment according to which the first spring member is looping around said gas rail and/or said valve body, and/or in particular said first spring member and said locking member together loop around both said gas rail and said valve body, such looping around may be achieved by a first spring member, or a first spring member and said locking member, which loop around said gas rail and/or said valve body in eight-form or circular. In looping around said gas rail and said valve body in eight-form, said gas rail and said valve body are, preferably each completely enclosed. In looping around said gas rail and said valve body in circular form said gas rail and said valve body are together completely enclosed once.

In a further advantageous embodiment of the inventive gas circuit, said first spring member has at least one contact zone contacting said gas rail or said valve body, wherein said first spring member further has a spring zone spring-loading said contact zone against at least one of said attachment means.

Such contact zone is preferably configured such that said contact zone may transfer a spring force, particularly of said spring member, to the components to be tensioned. A spring zone, preferably is configured such that is not in contact with the gas rail and/or the valve body, as such spring zone is to exhibit a spring force.

In a further advantageous embodiment of the inventive gas circuit, said first spring member has at least two contact zones respectively contacting said gas rail and/or said valve body, wherein said first spring member further has a spring zone spring-loading said contact zones against each other.

In a further advantageous embodiment of the inventive gas circuit, said gas tube is connected with said gas valve in a flow conducting manner, wherein said gas tube is inserted into and/or sealed to a gas outlet of said valve body and resiliently fixed to said valve body by means of said first spring member or by means of a further spring member.

Such resilient fixation advantageously allows for a gas valve assembly with fewer parts, and, particularly, an easier and faster mounting or demounting.

In a further advantageous embodiment of the inventive gas circuit, said first spring member and/or said further spring member and/or said locking member is made from sheet metal.

A first spring member and/or a further spring member and/or a locking member made from sheet metal may advantageously be manufactured in an easy and relatively cheap way. More importantly, the use of sheet metal allows manufacturing easily a high variety of forms of such first spring member and/or such further spring member and/or such locking member. However, other materials may also be used as an alternative or additionally. Particularly, in a further advantageous embodiment of the inventive gas circuit, said first spring member and/or said further spring member and/or said locking member is made from polymer.

The above described problems are also advantageously solved by a gas valve assembly for a gas circuit as disclosed herein.

Such a gas valve assembly for a gas circuit, in particular for a gas circuit according to the present invention, comprises a gas valve with a valve body and fixation means for fixing said valve body to a gas rail of said gas circuit such that said gas valve is supported by said gas rail, and is characterized in that said fixation means comprise a first spring member arranged for looping around said gas rail and/or said valve body, thereby resiliently bracing said gas valve and said gas rail.

Such gas valve assembly according to the present invention may be provided as supply or exchange parts, which advantageously may allow for a relatively cheap and easy retrofitting or upgrading of an existing appliance, particularly with such gas valve assembly or gas circuit according to the present invention, and/or a relatively easy and cheap exchange, e.g. in case of wearing or damage.

It is within the scope of the invention that embodiments, features and advantages of the gas circuit according to the present invention, and particularly of the gas valve assembly in said gas circuit according to the present invention, as described herein, may also be embodiments, features and advantages of the gas valve assembly according to the present invention.

The above described problems are also advantageously solved by a fixation means for a gas valve assembly as disclosed herein.

Such fixation means for a gas valve assembly, in particular for a gas valve assembly according to the present invention, for a gas circuit, in particular for a gas circuit according to the present invention, are arranged for fixation of a valve body of a gas valve of said gas valve assembly to a gas rail of said gas circuit such that said gas valve is supported by said gas rail, and are characterized in that said fixation means comprise a first spring member arranged for looping around said gas rail and/or said valve body, thereby resiliently bracing said gas valve and said gas rail.

Such fixation means according to the present invention may be provided as supply or exchange parts, which advantageously may allow for a relatively cheap and easy retrofitting or upgrading of an existing appliance, particularly with a gas valve assembly or gas circuit according to the present invention, and/or a relatively easy and cheap exchange, e.g. in case of wearing or damage.

It is within the scope of the invention that embodiments, features and advantages of the gas circuit according to the present invention, and particularly of the fixation means in said gas circuit according to the present invention, as described herein, may also be embodiments, features and advantages of the fixation means according to the present invention.

The above described problems are also advantageously solved by a kitchen appliance as disclosed herein.

Such a kitchen appliance, in particular a gas stove or a gas oven, comprises a gas circuit according to the present invention.

It will be immediately understood by a person skilled in the art, that the present invention, particularly, a Gas circuit, a Gas valve assembly, and Fixation means for a gas valve assembly according to the present invention may be applied to kitchen appliances of various type.

In a preferred embodiment, a kitchen appliance according to the present invention is a gas stove, gas oven or a gas cooktop.

In such kitchen appliance selected from the group of gas stove, gas oven or a gas cooktop, the gas circuit, gas valve assembly, and fixation means for a gas valve assembly according to the present invention are particularly advantageous.

It is within the scope of the invention that embodiments, features and advantages of the gas circuit according to the present invention, and particularly of the kitchen appliance according to said gas circuit according to the present invention, as described herein, may also be embodiments, features and advantages of the kitchen appliance according to the present invention.

All described embodiments of the invention have the advantage, that complexity of the gas valve assembly is reduced, particularly in that a screwing step is not needed. Furthermore, a more precise positioning of the gas valve assembly, particularly the gas valve onto the gas rail is facilitated, particularly as a relatively large interface area may be provided between such fixation means, particularly the first spring member, and other assembly components, particularly the gas valve, valve body, and the gas rail. This advantageously allows for a gas circuit and/or a gas valve assembly according to the present invention, which is relatively fast to assemble, and whereby, particularly screws are not needed for the assembly. Particularly, the gas circuit and/or the gas valve assembly according to the present invention may be configured as a screw-free gas circuit and/or the gas valve assembly.

The present invention will be described in further detail with reference to the drawings from which further features, embodiments and advantages may be taken, and in which:

FIG. 1 illustrates a perspective view of a gas circuit in a kitchen appliance showing three different gas valve assemblies, particularly a first and a second inventive embodiment///

Figure 4A:
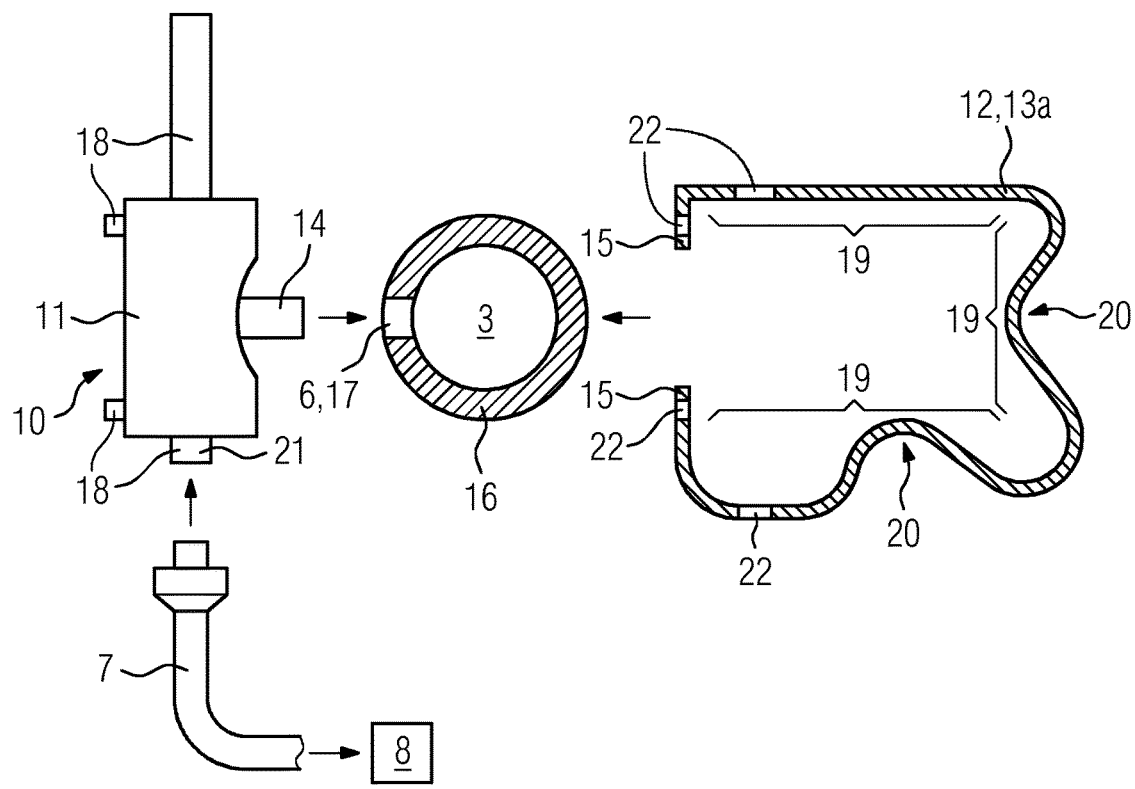
Figure 4B:
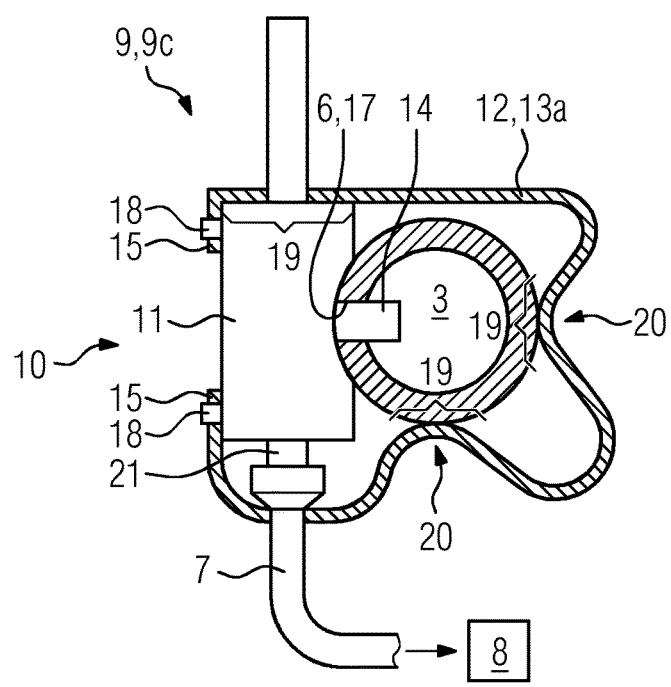
Figure 5A:
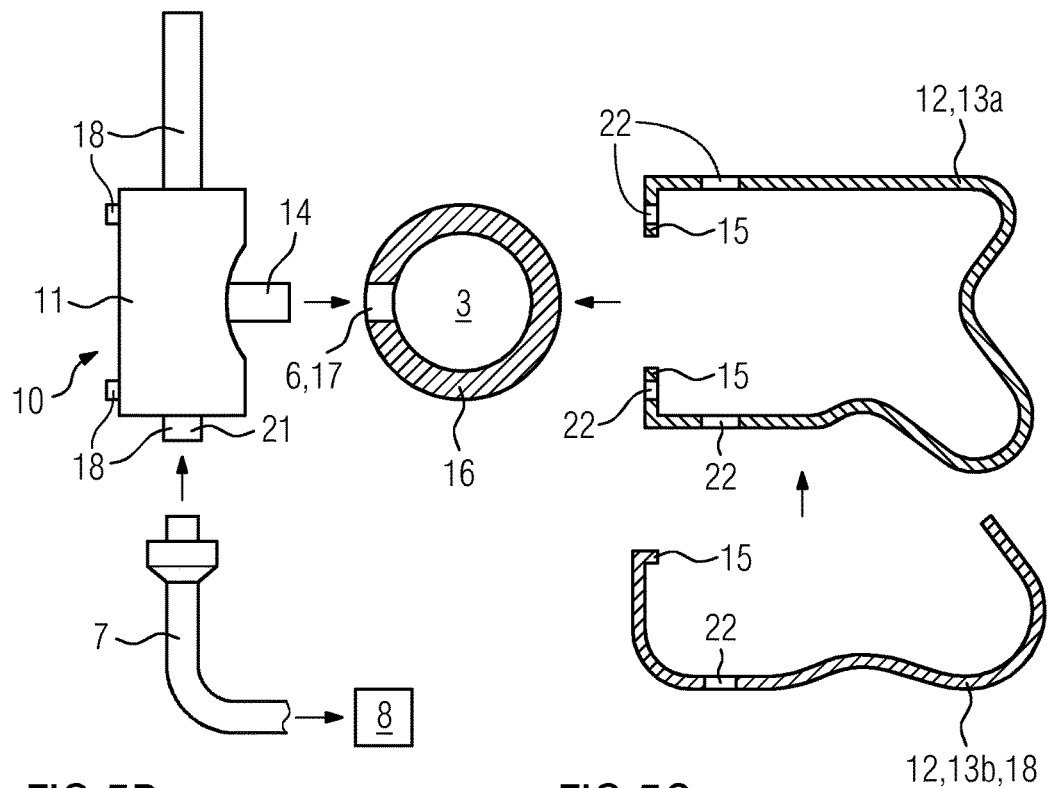
Figure 5B:
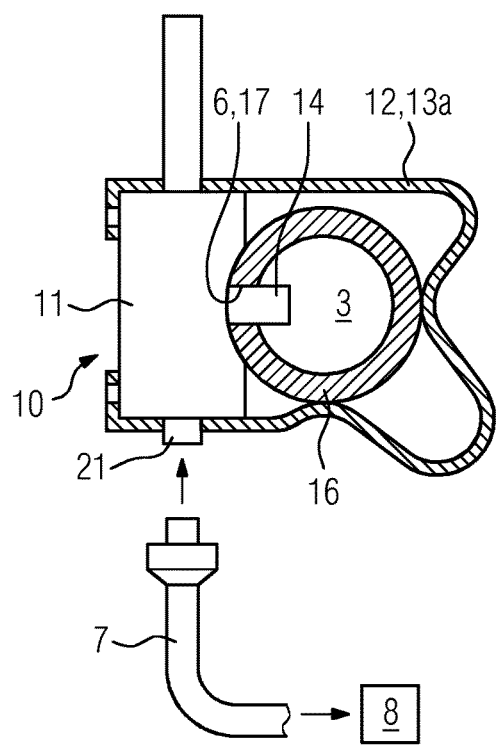
Figure 5C:
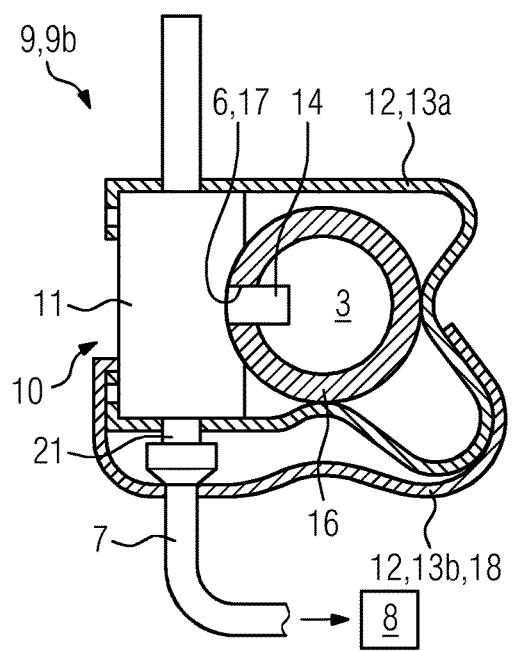
Figure 6:
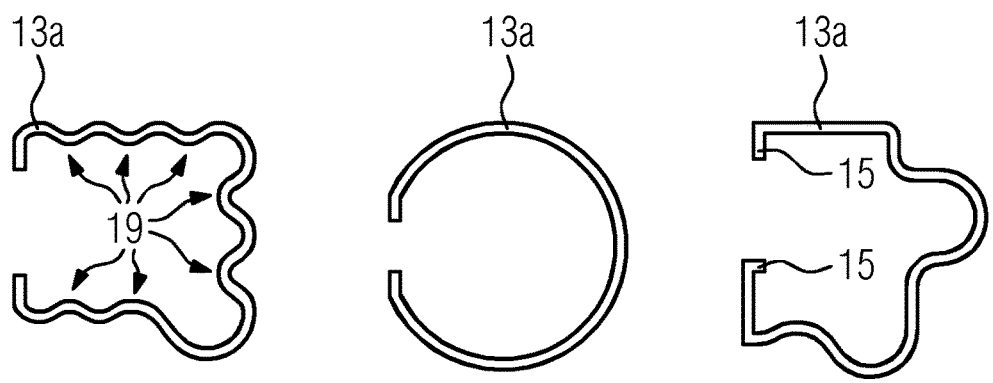

FIGS. 3A, 3B, 3C, and 3D illustrate a series of perspective views of a gas valve assembly showing the first inventive embodiment;

FIGS. 4A, and 4B illustrate a series of perspective side views of a gas valve assembly showing a third inventive embodiment;

FIGS. 5A, 5B, and 5C illustrate a series of perspective views of a gas valve assembly showing a fourth inventive embodiment; and FIG. 6 illustrates a series of perspective side views of spring members.

FIG. 1 shows a gas circuit 1 for a kitchen appliance 2 comprising a gas rail 3 with a gas inlet 4 for connecting said gas rail 3 to a gas source 5. Said gas source 5 is only schematically indicated in FIG. 1 for purpose of understanding. Said gas rail 3 further comprises gas outlets 6 to which gas valves 10 are assembled in three different gas valve assemblies 9a, 9b, and 9c.

Particularly, said gas circuit 1 further comprises gas tubes 7 for providing gas from said gas outlets 6 each to a gas hob 8. Said gas hobs 8 are only schematically indicated in the FIG. 1. Said gas circuit 1 further comprises said different gas valve assemblies 9a, 9b, and 9c. As FIG. 1 serves for illustrative purpose, three different gas valve assemblies 9a, 9b, and 9c are shown, side by side, assembled on the same gas rail 3. Particularly, the gas valve assembly shown on the left side has no fixation means, particularly no spring member, according to the present invention and reflects a gas valve assembly as usually applied in the art. In such gas valve assembly 9a, the gas valve 10 is fixed with a single screw or by using a bracket and screw(s) to the gas rail 3.

Furthermore, two embodiments of inventive gas valve assemblies are shown, particularly, gas valve assembly 9b showing the first inventive embodiment, and gas valve assembly 9c showing the second inventive embodiment.

Each gas valve assembly 9a, 9b and 9c connects a gas tube 7 to a gas outlet 6, which is hidden by the valve body 11 in FIG. 1. Such gas outlet 6 of said gas rail 3 is connected to the respective gas tube 7 in a flow conducting manner, by the gas valve assembly, allowing for fluid communication, particularly regulated by said gas valve 10. Each gas valve assembly 9a, 9b and 9c comprises such gas valve 10, which has at least a valve body 11 and which may have further elements, such as a regulating shaft, as shown in FIG. 1. Furthermore, the gas valve 10 is fixed to the gas rail by fixation means 12. As may be seen in FIG. 1 in a gas valve assembly 9a according to the prior art the gas valve body 11 is screwed to the gas rail 3. According to the inventive embodiments of the gas valve assembly 9b and 9c, the inventive gas valve assemblies 9b and 9c each comprise at least one fixation means 12, which comprises at least one first spring member 13a looping around said gas rail 3 and/or said valve body 11, and fixing said valve body 11 to said gas rail 3 such that said gas valve 10 is supported by said gas rail 3. Thereby said fixation means 12, particularly said at least one first spring member 13a, resiliently braces said gas valve 10 and said gas rail 3.

Figure 2A:
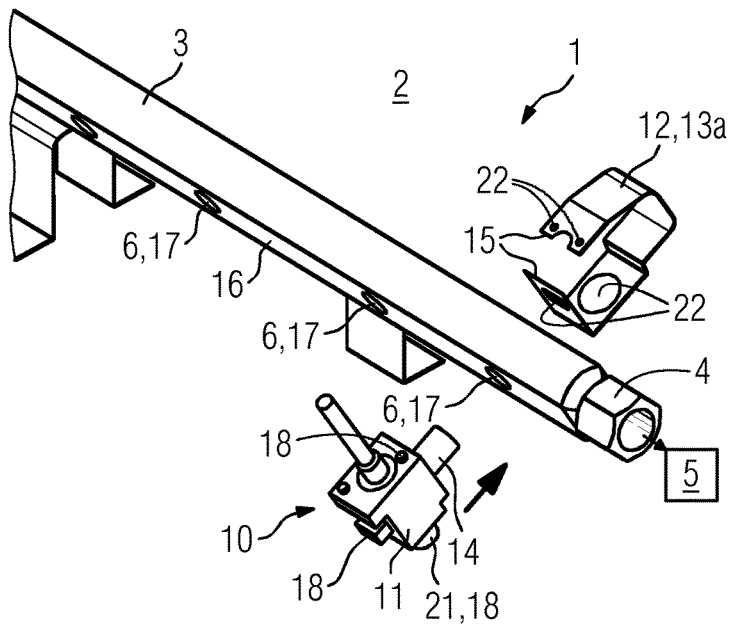
FIGS. 2A, 2B and 2C illustrate a series of perspective views of a gas valve assembly showing the second inventive embodiment.
Figure 2B:
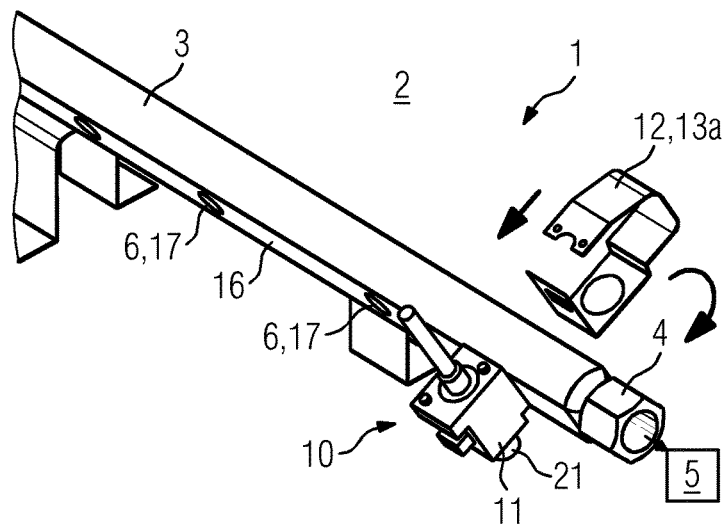
Figure 2C:
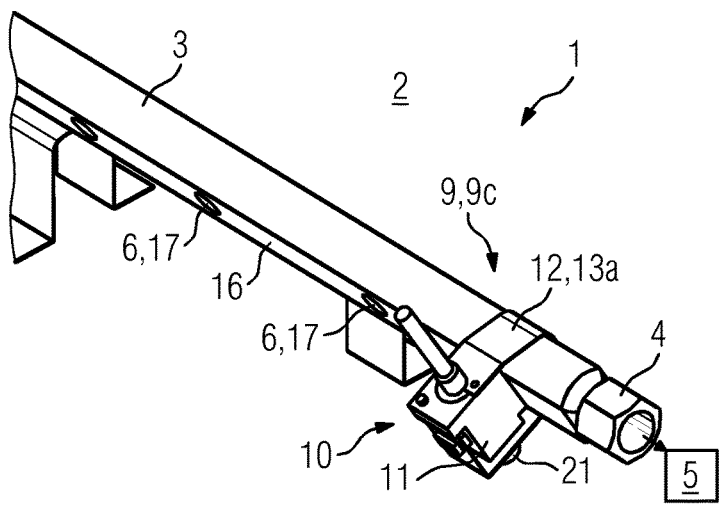

FIGS. 2A, 2B and 2C show a series of perspective views of a gas valve assembly 9c showing the second inventive embodiment. Particularly, FIG. 2A shows the inventive gas valve assembly 9c in an unassembled state, whereas FIG. 2B shows the inventive gas valve assembly 9c in a state in which an inlet duct 14 of said gas valve 10 is inserted into and/or sealed to an opening 17 of said gas rail 3, serving as a gas outlet 6 of said gas rail 3. As may be taken from FIG. 2A said gas rail 3, particularly in one side wall of said gas rail 3, various openings 17 are arranged for assembling a gas valve 10. In FIG. 2C the inventive gas valve assembly 9c is shown in a mounted state, according to which the fixation means 12 comprising a first spring member 13 is looping around said gas rail 3 and/or said valve body 11, thereby resiliently bracing said gas valve 10 and said gas rail 3. The first spring member 12, 13a thereby comprises attachment means 15 at its two opposite sides. Said attachment means 15 may in particular be configured as hooks, bails, grooves, or spring-loaded edges. The attachment means 15 attach said spring member 12, 13a to said valve body 11, which may be best seen from FIG. 2B and FIG. 2C, wherein in particular said spring member 12, 13a is looping around said gas rail 3. The embodiment of the present invention shown in FIGS. 2A, 2B and 2C advantageously allows to fix the gas valve 10 to the gas rail 3 with said single spring member 12, 13a.

Such first spring member 13 may also be shaped to fit to a gas valve 10. For example, such first spring member 13 may comprise through holes, openings, and/or recesses to fit to the particular gas valve 10. For example, an opening 22 may be provided as to receive and/or surround a locking member 18 of the gas valve 10, e.g. in the form of a protrusion, shaft element, or a connection point.

FIGS. 3A, 3B, 3C, and 3D illustrate a series of perspective views of a gas valve assembly 9b showing the first inventive embodiment. Again the series represented by FIGS. 3A, 3B, 3C, and 3D illustrates the assembly process of such gas valve assembly 9b. In FIG. 3A the gas valve assembly 9b is shown in an unassembled stage. In FIG. 3B the inventive gas valve assembly 9c is shown in a state in which an inlet duct 14 of said gas valve 10 is inserted into and/or sealed to an opening 17 of said gas rail 3, serving as a gas outlet 6 of said gas rail 3. The embodiment shown in FIGS. 3A to 3D departs from the embodiment shown in FIGS. 2A to 2C, in that, and as may be seen according to FIG. 3C, a further spring member 13b is arranged at the gas valve body 11, looping around said gas valve 10. Thereby the second spring member 12, 13b advantageously connects the two ends of the first spring member 12, 13a and thereby closes the loop around the gas rail 3 and valve 10. As may be seen from FIG. 3D, a first spring member 13 is attached to fix the valve body 11 to said gas rail 3 such that said gas valve 10 is supported by said gas rail 3, whereby the first spring member 13 is looping around said gas rail 3 and together with the further spring member 13b is looping around said valve body 11, thereby resiliently bracing said gas valve 10 and said gas rail 3. This provides an advantageous solution using two spring members 12, 13a and 12, 13b to fix the gas valve 10 onto the gas rail 3. Particularly, such spring system of the two spring members 12, 13a and 12, 13b can be adapted easily to be used also with gas valves as usually applied in the art. Thereby such second spring member 12, 13b could be designed and adapted ad hoc to adapt to the gas valve body and serve as locking reference to the first spring member 12, 13a. Accordingly, it can be refrained from the usually applied screwing. Moreover, which such spring system of the two spring members 12, 13a and 12, 13b such adaptation does not require modification of the used gas valves.

As may be seen from FIG. 3A in connection with FIG. 3D also in this embodiment the spring member 12, 13a comprises an opening 22, which is configured to receive the gas outlet 21 of the valve body 11, and which serves also as a locking member 18 for the purpose of securing and accurate positioning the gas valve 10 to the gas rail 3.

In FIG. 4A and FIG. 4B a series of perspective side views of a gas valve assembly 9 according to a third inventive embodiment is shown. FIG. 4A shows the gas valve assembly 9 in an unassembled state, whereas FIG. 4B shows the gas valve assembly 9 in an assembled state. As may be taken from FIGS. 4A and 4B, a gas circuit 1 for a kitchen appliance 2 is provided comprising a gas rail 3, here shown in cross-section, which may be connected with a gas inlet 4 to a gas source 5. Such gas rail 3 comprises at least one gas outlet 6, here an opening 17 arranged in a side wall 16 of said gas rail 3. Said gas circuit 1 further comprises a gas tube 7 for providing gas from said gas outlet 6 to a gas hob 8. Said gas circuit 1 further comprises a gas valve assembly 9 connecting said gas tube 7 to said gas outlet 6 of said gas rail 3 in a flow conducting manner. Said gas valve assembly 9 further comprises a gas valve 10 with a valve body 11, wherein said gas valve 10 also comprises an inlet duct 14, said inlet duct 14 being at least partially inserted into and/or sealed to said opening 17. Said gas valve assembly 9 further comprises fixation means 12 fixing said valve body 11 to said gas rail 3 such that said gas valve 10 is supported by said gas rail 3, whereby said fixation means 12 comprise a first spring member 13 looping around said gas rail 3 and said valve body 11, thereby resiliently bracing said gas valve 10 and said gas rail 3.

As may be taken from FIGS. 4A and 4B said first spring member 13 comprises attachment means 15 at two opposite sides, said attachment means 15 in particular being any of hooks, bails, grooves, or spring-loaded edges. Said attachment means 15 attach said spring member 13a to said valve body 11. From FIGS. 4A and 4B it may be immediately taken, that for such assembly the gas tube 7, which may particularly be of a round section, is connected with said gas valve 10 in a flow conducting manner, wherein said gas tube 7 is inserted into and/or sealed to a gas outlet 21 of said valve body 11. Particularly said connection of said gas tube 7 being inserted into and/or sealed to a gas outlet 21 may be configured with out any thread or screw, as the gas tube 7 may be also resiliently fixed to said valve body 11 by means of said first spring member 13a.

As may be best seen from FIG. 4A, the fixation means 12, 13a may comprise openings 22 for securing the fixation means to a locking member 18, wherein said attachment means 15 attach said first spring member 13a to said locking member 18. Particularly, the spring member 13a is looping around said gas rail 3 and mounted with each end to a locking member 18. Particularly, such locking member 18, may be configured or designed also in the form of or by means of hooks, bails, grooves, or spring-loaded edges.

Particularly, said first spring member 13a has several contact zones 19 for contacting said gas rail 3 or said valve body 11, and further at least two spring zones 20 spring-loading said contact zones 19 against at least one of said attachment means 15. As may be also seen from FIG. 4A or FIG. 4B, the first spring member 13a is made from sheet metal.

With regard to the embodiment shown in FIGS. 4A and 4B, said embodiment differs from the embodiment shown in FIGS. 2A to 2C, and 3A to 3D, respectively, in that said embodiment uses a single first spring member 12, 13a to fix the gas valve 10 and the respective gas tube 7 to the gas rail 3. Accordingly, no screwing is needed to fix the gas valve 10 to the gas rail 3, and no screwing is needed to fix the gas tube 7 to the valve 10, both reducing the Direct Labour costs. In other words, both the gas valve 10 and the gas tube 7 are fixed by a single fixation means 12, 13a, onto the gas rail 3. Such assembly can be advantageously to also upgrade or retrofit gas valves and gas rails known in the art, without the need to modify current gas valves.

FIGS. 5A, 5B, and 5C, which illustrate a series of perspective views of a gas valve assembly 9 showing a fourth inventive embodiment, depart from FIGS. 4A and 4B and the third inventive embodiment in that said gas tube 7 is connected with said gas valve 10 in a flow conducting manner, wherein said gas tube 7 is inserted into and/or sealed to a gas outlet 21 of said valve body 11 and resiliently fixed to said valve body 11 by means of said first spring member 13a and by means of a further spring member 13b. Particularly, the fixation means 12 comprises a spring member 13, which is formed as two-piece, comprising first spring member 13a and a further spring member 13b, whereby spring member 13a and a further spring member 13b are mounted together on one side, and mounted to the gas valve 10 on the other side, respectively. Moreover, said further spring member 13b is arranged such that said further spring member 13b secures and supports said first spring member 13a in fixing said valve body 11 to said gas rail 3 such that said gas valve 10 is supported by said gas rail 3. Particularly, said first spring member 13a and said second spring member 13b loop around said gas rail 3 and said valve body 11, thereby resiliently bracing said gas valve 10 and said gas rail 3. According to this embodiment shown in FIGS. 5A to 5C two spring members 12, 13a and 12, 13b are used to fix the gas valve and its respective gas tube 7 to the gas rail 3. Thereby the second spring member 12, 13b also serves as a locking member 18, also comprising attachment means 15, in the form of spring loaded edges. The second spring member 12, 13b, 18 is used to attach said first spring member 13a to the valve 10 and looping around said valve 10 and said gas rail 3, wherein in particular said first spring member 13a and said second spring member 12, 13b, 18 together loop around both said gas rail and said valve body.

This particularly allows for an easier mounting of the gas valve assembly. More particularly, the locking member allows for a more secure mounting of the spring member. Additionally, said fixation means may be configured as a multi-piece, particularly two-piece. Accordingly, such fixation means may be easily mounted around an element protruding from said valve, particularly said valve body, e.g. a shaft of the gas valve.

Alternatively, the gas valve 10 and gas tube 7 could be fixed to the gas rail 3 by using an individual spring member for each. Advantageously, no screwing operation is used to fix the gas valve 10 to the gas rail 3 and no screwing operation is used to fix the gas tube 7 to the valve body 11, both significantly reducing the Direct Labour costs. Moreover, using such assembly for gas rails and valves usually used in the art, it is not required to modify the current gas valves or gas rails, respectively. Moreover, in the event of maintenance, the gas valve or gas tube can be un-mounted separately.

FIG. 6 illustrates a series of perspective side views of spring members. It is immediately apparent that various forms of spring members, particularly of a first spring member 13a of the present invention may be realized.

Particularly, said first spring member 13 has at least one contact zone 19 for contacting said gas rail 3 or said valve body 11, wherein said first spring member 13*a* further has a spring zone 20 spring-loading said contact zone 19 against at least one of said attachment means 15. Particularly, said first spring member 13 may also have at least two contact zones 19 respectively contacting said gas rail 3 and/or said valve body 11, wherein said first spring member 13*a* further has a spring zone 20 spring-loading said contact zones 19 against each other.

The features of the present invention disclosed in the specification, the claims, and/or the figures may both separately and in any combination thereof be material for realizing the invention in various forms thereof.

LIST OF REFERENCE NUMERALS

1 Gas circuit
2 kitchen appliance
3 gas rail
4 gas inlet
5 gas source
6 gas outlet
7 gas tube
8 gas hob
9 gas valve assembly
10 gas valve
11 valve body
12 fixation means
13*a*, 13*b* spring member
14 inlet duct of gas valve
15 attachment means
16 sidewall of gas rail
17 opening in gas rail
18 locking member
19 contact zone
20 spring zone
21 gas outlet of said valve body
22 opening

The invention claimed is:

1. A gas circuit for a kitchen appliance comprising a gas rail with a gas inlet for connecting said gas rail to a gas source and with at least one gas outlet, said gas circuit further comprising a gas tube for providing gas from said gas outlet to a gas hob, and said gas circuit further comprising a gas valve assembly connecting said gas tube to said gas outlet of said gas rail in a flow conducting manner, said gas valve assembly comprising a gas valve with a valve body and fixation means that fix said valve body against said gas rail such that said gas valve is supported by said gas rail, wherein said fixation means comprises at least one spring member enclosing said gas rail and said valve body, thereby resiliently bracing said gas valve and said gas rail.

2. The gas circuit according to claim 1, wherein said gas outlet of said gas rail is an opening of said gas rail, wherein said gas valve comprises an inlet duct, said inlet duct being at least partially inserted into and/or sealed to said opening.

3. The gas circuit according to claim 2, said opening being arranged in a side wall of said gas rail.

4. The gas circuit according to claim 1, wherein said at least one spring member comprises attachment means at two opposite sides, said attachment means being any of hooks, bails, grooves and spring-loaded edges.

5. The gas circuit according to claim 4, wherein the fixation means comprise(s) a locking member, wherein said attachment means attach said at least one spring member to said locking member wherein said at least one spring member and said locking member together enclose both said gas rail and said valve body, or wherein said attachment means at opposite sides of said at least one spring member are mutually attached to each other wherein said at least one spring member encloses both said gas rail and said valve body.

6. The gas circuit according to claim 1, wherein said at least one spring member has at least one contact zone contacting said gas rail or said valve body, wherein said at least one spring member further has a spring zone spring-loading said contact zone against attachment means.

7. The gas circuit according to claim 1, wherein said at least one spring member has at least two contact zones respectively contacting said gas rail and/or said valve body, wherein said at least one spring member further has a spring zone spring-loading said contact zones against each other.

8. The gas circuit according to claim 1, wherein said gas tube is connected with said gas valve in a flow conducting manner, wherein said gas tube is inserted into and/or sealed to a gas outlet of said valve body and resiliently fixed to said valve body by means of said at least one spring member.

9. The gas circuit according to claim 8, wherein at least one of said at least one spring member and said locking member is made from sheet metal.

10. A kitchen appliance comprising the gas circuit according to claim 1.

11. The gas circuit according to claim 1, said at least one spring member comprising first and second spring members that together enclose said gas rail and said valve body.

12. A gas valve assembly for a gas circuit, said gas valve assembly comprising a gas valve with a valve body and fixation means configured to fix said valve body against a gas rail of said gas circuit such that said gas valve is supported by said gas rail, wherein said fixation means comprises at least one spring member arranged for enclosing said gas rail and said valve body, thereby resiliently bracing said gas valve and said gas rail.

13. A fixation means for a gas valve assembly for a gas circuit, said fixation means being configured to fix a valve body of a gas valve of said gas valve assembly against a gas rail of said gas circuit such that said gas valve is supported by said gas rail, wherein said fixation means comprises at least one spring member arranged for enclosing said gas rail and said valve body, thereby resiliently bracing said gas valve and said gas rail.

14. A gas circuit for a kitchen appliance comprising a gas rail having a gas outlet, a gas valve comprising a valve body and an inlet duct, said valve body being seated directly against said gas rail such that said inlet duct is received within said gas rail through said gas outlet, and fixation means for fixing said valve body against said gas rail such that said gas valve is supported by said gas rail, said fixation means comprising at least one spring member enclosing said gas rail and said valve body to thereby resiliently brace said gas valve and said gas rail together under a spring tension of said at least one spring member without screwing components, said at least one spring member possessing sufficient interfacial area with at least one of said valve body and said gas rail to ensure precise positioning thereof upon resilient closure of said at least one spring member via a snap action to brace said gas valve and said gas rail together, said fixation means being devoid of any further supporting element that is secured or mounted to a wall of the appliance, said gas circuit being screw-free.

15. The gas circuit according to claim 14, said at least one spring member comprising opposing ends, each of said opposing ends being secured to said gas valve via respective cooperating locking members on the valve body.

16. The gas circuit according to claim 14, said gas valve further comprising a gas tube in fluid communication with a gas outlet duct of said gas valve to carry gas delivered through said gas rail, via said valve and out from said gas outlet duct to said appliance, said fixation means further resiliently bracing said gas tube to said gas valve such that said fixation means is effective to fix both said gas valve and said gas tube onto the gas rail.

17. The gas circuit according to claim 16, said at least one spring member being effective to fix both said gas valve and said gas tube onto the gas rail.

18. The gas circuit according to claim 14, said at least one spring member comprising first and second spring members that together enclose said gas rail and said valve body.

\* \* \* \* \*